United States Patent
Bhowal et al.

(10) Patent No.: US 8,728,391 B2
(45) Date of Patent: May 20, 2014

(54) MACHINED COMPONENT MANUFACTURING METHOD FOR ENHANCED LOW CYCLE FATIGUE LIFE

(75) Inventors: Prabir R. Bhowal, Rocky Hill, CT (US); Agnieszka M. Wusatowska-Sarnek, Mansfield Center, CT (US)

(73) Assignee: United Technologies Corporation, Hartford, CT (US)

( * ) Notice: Subject to any disclaimer, the term of this patent is extended or adjusted under 35 U.S.C. 154(b) by 84 days.

(21) Appl. No.: 13/455,409

(22) Filed: Apr. 25, 2012

(65) Prior Publication Data
US 2012/0315179 A1 Dec. 13, 2012

Related U.S. Application Data

(62) Division of application No. 12/277,551, filed on Nov. 25, 2008, now Pat. No. 8,209,845.

(51) Int. Cl.
C22C 19/03 (2006.01)
C22C 30/00 (2006.01)
B23P 13/04 (2006.01)

(52) U.S. Cl.
USPC .................................. 420/8; 420/441; 29/557

(58) Field of Classification Search
USPC ............ 29/557, 558, 402.01, 402.06, 402.04; 148/405; 451/28, 36; 134/6; 420/8, 420/441, 580
See application file for complete search history.

(56) References Cited

U.S. PATENT DOCUMENTS

| | | | |
|---|---|---|---|
| 4,026,779 A | 5/1977 | Shaw | |
| 4,454,740 A | 6/1984 | Neal et al. | |
| 4,512,115 A | 4/1985 | Miller | |
| 4,536,932 A | 8/1985 | Athey | |
| 4,645,561 A | 2/1987 | Rea | |
| 5,492,550 A | 2/1996 | Krishnan et al. | |
| 5,598,968 A * | 2/1997 | Schaeffer et al. | 228/262.31 |
| 6,171,711 B1 | 1/2001 | Draghi et al. | |
| 6,194,026 B1 | 2/2001 | Warnes et al. | |
| 6,331,217 B1 | 12/2001 | Burke et al. | |
| 6,571,472 B2 | 6/2003 | Berry et al. | |
| 6,805,750 B1 | 10/2004 | Ristau et al. | |
| 7,063,597 B2 | 6/2006 | Prabhu et al. | |
| 2005/0263171 A1 | 12/2005 | Wu et al. | |

FOREIGN PATENT DOCUMENTS

| | | |
|---|---|---|
| JP | 06-145783 | 5/1994 |
| JP | 2001 335833 | 12/2001 |

OTHER PUBLICATIONS

European Search Report for EP Application No. 09252671.4, Mar. 9, 2010.
Piearcey, B.J. et al., "The Carbide Phases in Mar-M200," Transaction of the Metallurgical Society of AIME, vol. 239, Apr. 1967, pp. 451-457, XP-002570260.

(Continued)

*Primary Examiner* — John C Hong
(74) *Attorney, Agent, or Firm* — Carlson, Gaskey & Olds, P.C.

(57) ABSTRACT

A manufacturing method includes providing a component, such as a superalloy aircraft component, with a substrate surface having damaged brittle compound particles from machining. The manufacturing method removes the damaged compound particles from the substrate surface without producing significant amount of new damaged compound particles in the substrate surface. In one example, the damaged compound particles are removed with an abrasive media. The method results in a machined substrate surface free from damaged intermetallic component particles.

18 Claims, 1 Drawing Sheet

(56) References Cited

OTHER PUBLICATIONS

Lacaze et al., "Directionally Solidified Materials: Nickel-Base Superalloys for Gas Turbines," Textures and Microstructures, vol. 13, 1990, pp. 1-14, XP-002570261.

Prabir R. Bhowal et al., "Carbides and Their Influence on Notched Low Cycle Fatigue Behavior of Fine-Grained IN718 Gas Turbine Disk Material", IN718 Superalloy Conference, Oct. 2005, Edited by TMS (The Minerals, Metals & Materials Society), 2005.

AMS Handbooks, vol. 5, Surface Engineering, "Barrel Finishing", AMS On-Line, 2002.

LaRoux K. Gillespie, "Deburring and Edge Finishing", SME Handbook, 1999.

\* cited by examiner

MACHINED COMPONENT MANUFACTURING METHOD FOR ENHANCED LOW CYCLE FATIGUE LIFE

This application is a divisional application of U.S. Ser. No. 12/277,551, filed on Nov. 25, 2008 now U.S. Pat. No. 8,209,845.

BACKGROUND

This disclosure relates to a manufacturing method for improving low cycle fatigue life of machined components, such as aircraft components.

Many machined components, such as disks and rotating shafts of gas turbine engines, are made from superalloys, such as nickel. Some nickel superalloys include brittle compound particles, such as carbides or oxides.

Typically, these superalloy components are machined subsequent to a casting or forging process. A cutting tool can damage or crack the carbides and/or oxides during machining, which provides weakened sites at which fatigue cracks may initiate. Fatigue cracks result in reduced low cycle fatigue life that can significantly limit the service life of the component. Superalloy components having carbides and/or oxides that have been low-stress ground exhibit improved low cycle fatigue life. Low-stress grinding is quite time consuming and expensive. Furthermore, low-stress grinding can only be utilized on smooth, readily accessible surfaces and cannot be used on inaccessible features, such as notches, which are typical on most aircraft superalloy components. Accordingly, fatigue cracks may initiate at inaccessible, machined surfaces of superalloy components despite the use of low-stress grinding.

What is needed is improved low cycle fatigue life for superalloy components with brittle compound particles and machined surfaces.

SUMMARY

The disclosed method includes manufacturing a component, such as a superalloy aircraft component, by providing a substrate surface having damaged brittle compound particles from machining. The manufacturing method removes the damaged compound particles from the substrate surface without producing significant damaged compound particles. In one example, the damaged compound particles are removed with an abrasive media. For example, at least 0.0006 inch (0.01524 mm) of substrate surface is removed by the abrasive media. The method results in a machined substrate surface free from damaged compound particles.

These and other features of the disclosure can be best understood from the following specification and drawings, the following of which is a brief description.

DETAILED DESCRIPTION

Figure 1:
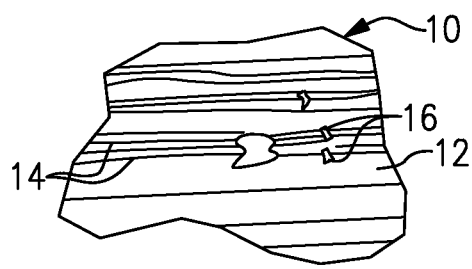
FIG. 1 is a simplified view of a machined substrate surface having damaged compound particles.

FIG. 1 depicts a component 10 having a substrate surface 12 that has been machined. The component 10 may be an aircraft component, such as a rotating disk or shaft or compressor rear seal of a gas turbine engine. In one example, the substrate is a nickel superalloy, such as Inconel 718. The substrate includes brittle compound particles, such as carbides or oxides, dispersed throughout, which is typical of such superalloys. Another example substrate is any steel of the type typically used in shafts and disks. Such steels typically include carbides.

Tool marks 14 produced by cutting tools during the machining process damage or crack the carbides and/or oxides 16. Example machining processes are lathe turning broaching, reaming, boring and milling. A typical median size of a cracked carbide may be approximately 0.0006-0.0008 inch (0.01524 mm-0.02032 mm). A large cracked carbide may be around 0.001 inch (0.0254 mm). The site of damaged compound particles can provide a location for early initiation of fatigue cracks, resulting in reduced low cycle fatigue life. Post-machining processing is desirable to counter the effects of the damaged compound particles on low cycle fatigue life.

Figure 2:
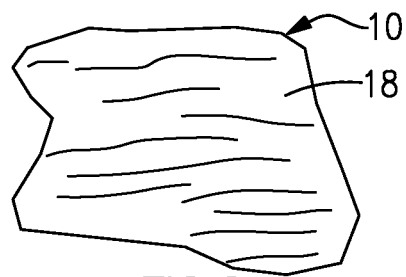
FIG. 2 is a simplified view of the substrate surface shown in FIG. 1 subsequent to removing the damaged compound particles.

FIG. 2 illustrates the component 10 with a finished surface 18 in which the damaged carbides and/or oxides 16 have been removed. In one example, a predetermined amount of the substrate surface 12 is removed subsequent to machining in an amount that corresponds to an average damaged or cracked compound particle size. In the example of cracked carbides, at least 0.0006 inch (0.01524 mm) is removed so that a new substrate surface substantially free of new damaged compound particles is produced.

Figure 3:
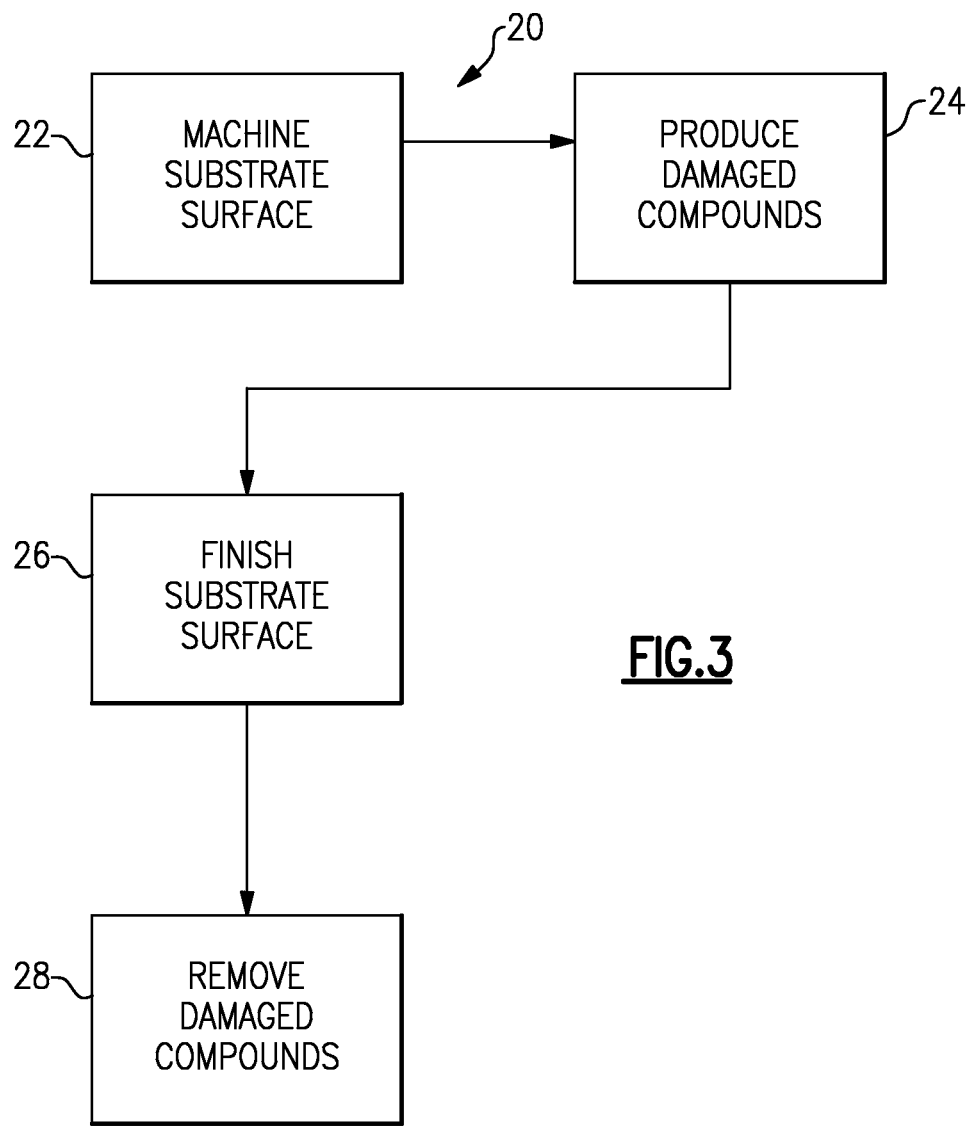
FIG. 3 is an example manufacturing method of removing damaged compound particles from a machined substrate surface.

An example manufacturing method 20 is shown in FIG. 3. The substrate surface is machined, as indicated at block 22, which results in damaged compound particles, as indicated at block 24. The machined substrate surface is finished to remove the predetermined amount of substrate, as indicated at block 26. One example substrate surface finishing process is to mechanically work the substrate surface with an abrasive media. In one example, the component is placed in a barrel, such as a Sutton barrel, with an abrasive media, such as No. 10 fused aluminum oxide. In one example, the abrasive media and component is suspended in water containing a detergent and a corrosive inhibitor. In one example process, the barrel is vibrated at about 320 oscillations per minute for about ninety minutes to remove at least 0.0006 inch (0.01524 mm) of substrate surface. The abrasive media removes the damaged compound particles and some of the substrate without producing any amount of new damaged compounds, as represented by block 28.

Parameters such as the speed, shape and size of the media and the duration for which the component is exposed to the media affect the amount of material removed from the substrate surface. The desired parameters can be empirically determined for each application. Removing the damaged compound particles eliminates sites that are susceptible to fatigue cracks, which extends the low cycle fatigue life of the component.

Other material removal processes can be used to improve low cycle fatigue life if, for example, the substrate surface is removed in an amount corresponding to the median damaged intermetallic compound particle size.

Although example embodiments have been disclosed, a worker of ordinary skill in this art would recognize that certain modifications would come within the scope of the claims. For that reason, the following claims should be studied to determine their true scope and content.

What is claimed is:

1. A superalloy component comprising at least one of carbides and oxides and a finished substrate surface free from damaged carbides and damaged oxides, the finished substrate surface corresponding to at least 0.0006 inch (0.01524 mm) of removed material from a machined substrate surface, wherein the removed material corresponds to an approximate median size of the damaged carbides and damaged oxides.

2. The superalloy component according to claim 1, wherein the finished substrate surface includes a nickel alloy substrate.

3. The superalloy component according to claim 1, wherein the finished substrate surface includes a steel alloy substrate.

4. The superalloy component according to claim 1, wherein machined substrate surface is provided by lathe turning.

5. The superalloy component according to claim 1, wherein the machined substrate surface is provided by broaching.

6. The superalloy component according to claim 1, wherein the machined substrate surface is provided by cutting.

7. The superalloy component according to claim 1, wherein the machined substrate surface is provided by reaming or boring.

8. The superalloy component according to claim 1, wherein the machined substrate surface is provided by milling.

9. The superalloy component according to claim 1, wherein the machined substrate surface is provided by abrasive media.

10. The superalloy component according to claim 1, wherein the machined substrate surface is provided by low stress grinding.

11. A superalloy component comprising at least one of carbides and oxides and a finished substrate surface free from damaged carbides and damaged oxides, the finished substrate surface corresponding to at least 0.0006 inch (0.01524 mm) of removed material from a cut substrate surface.

12. The superalloy component according to claim 11, wherein the finished substrate surface includes a nickel alloy substrate.

13. The superalloy component according to claim 11, wherein the finished substrate surface includes a steel alloy substrate.

14. The superalloy component according to claim 11, wherein machined substrate surface is provided by lathe turning.

15. The superalloy component according to claim 11, wherein the machined substrate surface is provided by broaching.

16. The superalloy component according to claim 11, wherein the machined substrate surface is provided by reaming or boring.

17. The superalloy component according to claim 11, wherein the machined substrate surface is provided by milling.

18. The superalloy component according to claim 11, wherein the machined substrate surface is provided by abrasive media.

* * * * *